United States Patent [19]

Kimura

[11] Patent Number: 4,999,788
[45] Date of Patent: Mar. 12, 1991

[54] ELECTRONIC EQUIPMENT FOR CREATING AND DISPLAYING A DOCUMENT REPRESENTATIVE OF ANOTHER DOCUMENT

[75] Inventor: Shinichi Kimura, Tokyo, Japan
[73] Assignee: Canon Kabushiki Kaisha, Tokyo, Japan
[21] Appl. No.: 393,117
[22] Filed: Aug. 4, 1989

Related U.S. Application Data

[63] Continuation of Ser. No. 96,243, Sep. 8, 1987, abandoned, which is a continuation of Ser. No. 701,764, Feb. 14, 1985, abandoned.

[30] Foreign Application Priority Data

Feb. 18, 1984 [JP] Japan ................................ 59-29430

[51] Int. Cl.⁵ .................... G06F 3/12; G06F 15/20; B41J 3/46
[52] U.S. Cl. ..................... 364/518; 364/900; 364/943; 340/721; 340/731; 340/750
[58] Field of Search ................ 364/518–519, 364/521, 900 MS File; 400/3, 76, 83, 279; 340/711, 721, 731, 750, 723, 798–799

[56] References Cited

U.S. PATENT DOCUMENTS

| 4,168,489 | 9/1979 | Ervin | 340/731 X |
|---|---|---|---|
| 4,190,835 | 2/1980 | Buynak | 340/709 X |
| 4,240,758 | 12/1980 | Acosta | 400/279 |
| 4,417,239 | 11/1983 | Demke et al. | 340/709 |
| 4,428,065 | 1/1984 | Duvall et al. | 364/900 |
| 4,451,900 | 5/1984 | Mayer et al. | 364/900 |
| 4,457,638 | 7/1984 | Horn et al. | 400/3 X |
| 4,495,490 | 1/1985 | Hopper et al. | 340/723 X |
| 4,504,825 | 3/1985 | Bergermann et al. | 340/709 |
| 4,649,380 | 3/1987 | Penna | 340/721 X |

OTHER PUBLICATIONS

*IBM Technical Disclosure Bulletin*, vol. 26, No. 3B, Aug. 1983, Paterson, R. L., "LCD Word Processing Display" pp. 1588–1589.
*IBM Technical Disclosure Bulletin*, vol. 15, No. 7, Dec. 1972, Webb, G. T., "Combination of Alphanumeric and Formating Data in CRT Display".

*Primary Examiner*—Joan H. Pendegrass
*Attorney, Agent, or Firm*—Fitzpatrick, Cella, Harper & Scinto

[57] ABSTRACT

Electronic equipment having a document creating function has a key input unit for inputting a document and tab and cursor position data, a memory unit for storing input characters, storage sections for storing input tab and cursor position data, a display unit for displaying the characters being input and the overall layout in a reduced scale, a printer, and a control unit for controlling the overall equipment. The overall layout of the document being created can easily be confirmed.

9 Claims, 2 Drawing Sheets

ELECTRONIC EQUIPMENT FOR CREATING AND DISPLAYING A DOCUMENT REPRESENTATIVE OF ANOTHER DOCUMENT

This application is a continuation of application Ser. No. 07/096,243 filed Sept. 8, 1987, now abandoned, which is a continuation of application Ser. No. 06/701,764, filed Feb. 14, 1985, now abandoned.

BACKGROUND OF THE INVENTION

1. Field of the Invention

The present invention relates to electronic equipment having a document creating function which edits a document input through an input means and prints the document as needed.

2. Description of the Prior Art

Among various types of electronic equipment having a document creating function, one having a layout display function of a created document is known. However, in a display unit of such electronic equipment, the number of characters which can be displayed on the screen at one time is limited. For this reason, even if the operator wants to confirm the overall layout of characters of a document, the overall character pattern cannot be displayed on the screen at the same time. In view of this problem, electronic equipment has been proposed wherein respective characters of a created document are not directly displayed on a display unit, but are displayed in the forms of, for example, one or a plurality of dots on the display, so that the operator can confirm the overall layout of characters. Conventional electronic equipment having a layout display function for allowing confirmation of the overall character arrangement of a created document is known.

Meanwhile, in some electronic equipment, the document editing function involves position data about column position alignment of a document, such as tabulation or indentation.

However, in the conventional layout display, the position data such as tabulation or indentation is not displayed. Particularly in a case when the display length of a display unit is shorter than one line of a created document, position data may be set at a position to the right of the position actually displayed on the display unit. This results in difficult column position alignment.

SUMMARY OF THE INVENTION

The foregoing deficiencies of prior art are overcome by the present invention. The present invention receives input characters through a keyboard or other types of input means. Tab positions or margin positions may also be input. A memory having a first memory section for storing characters and a second section for storing the tab position or margin position. A display is provided for displaying the characters from the first memory section on a first display section and for displaying a layout of the characters along with the position stored in the second memory section on a second display section.

DETAILED DESCRIPTION OF THE PREFERRED EMBODIMENT

The preferred embodiment of the present invention will now be described with reference to the accompanying drawings.

Figure 1:
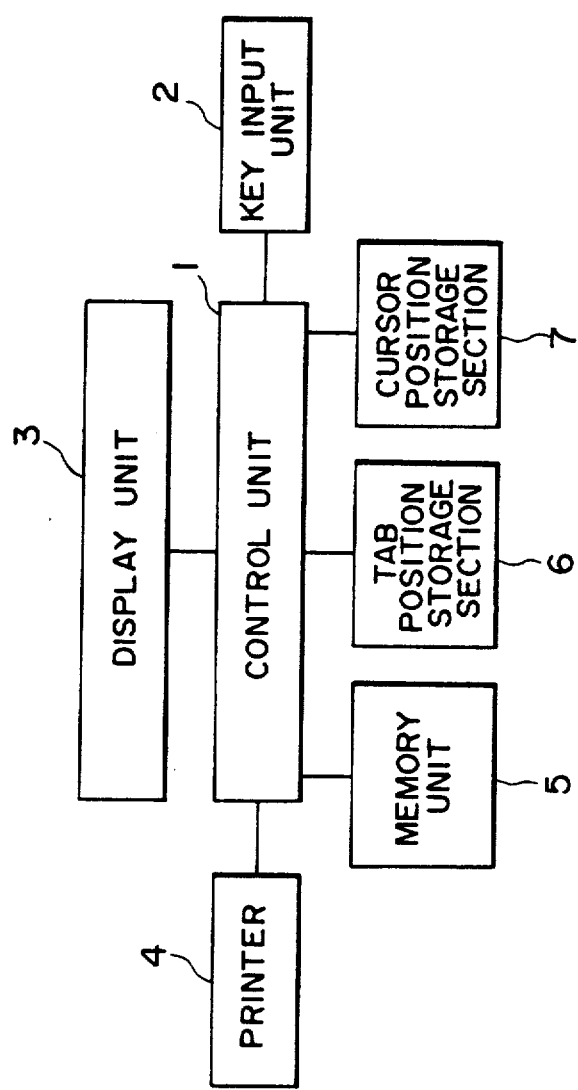
FIG. 1 is a block diagram of a Japanese wordprocessor according to an embodiment of the present invention.

FIG. 1 is a block diagram of a Japanese wordprocessor according to an embodiment of the present invention. Referring to FIG. 1, a control unit 1 controls the overall apparatus in accordance with a program stored in a memory unit to be described later. The operator inputs a document and function commands through a key input unit 2 The key input unit 2 has numeral keys, letter keys, kana keys, a tab set key, a tab reset key, and a tab key. A display unit 3, which may be a liquid crystal display or the like, displays the input document and a message to the operator The display unit 3 has a pair of memories in the display shown in FIG. 2.

Figure 3:
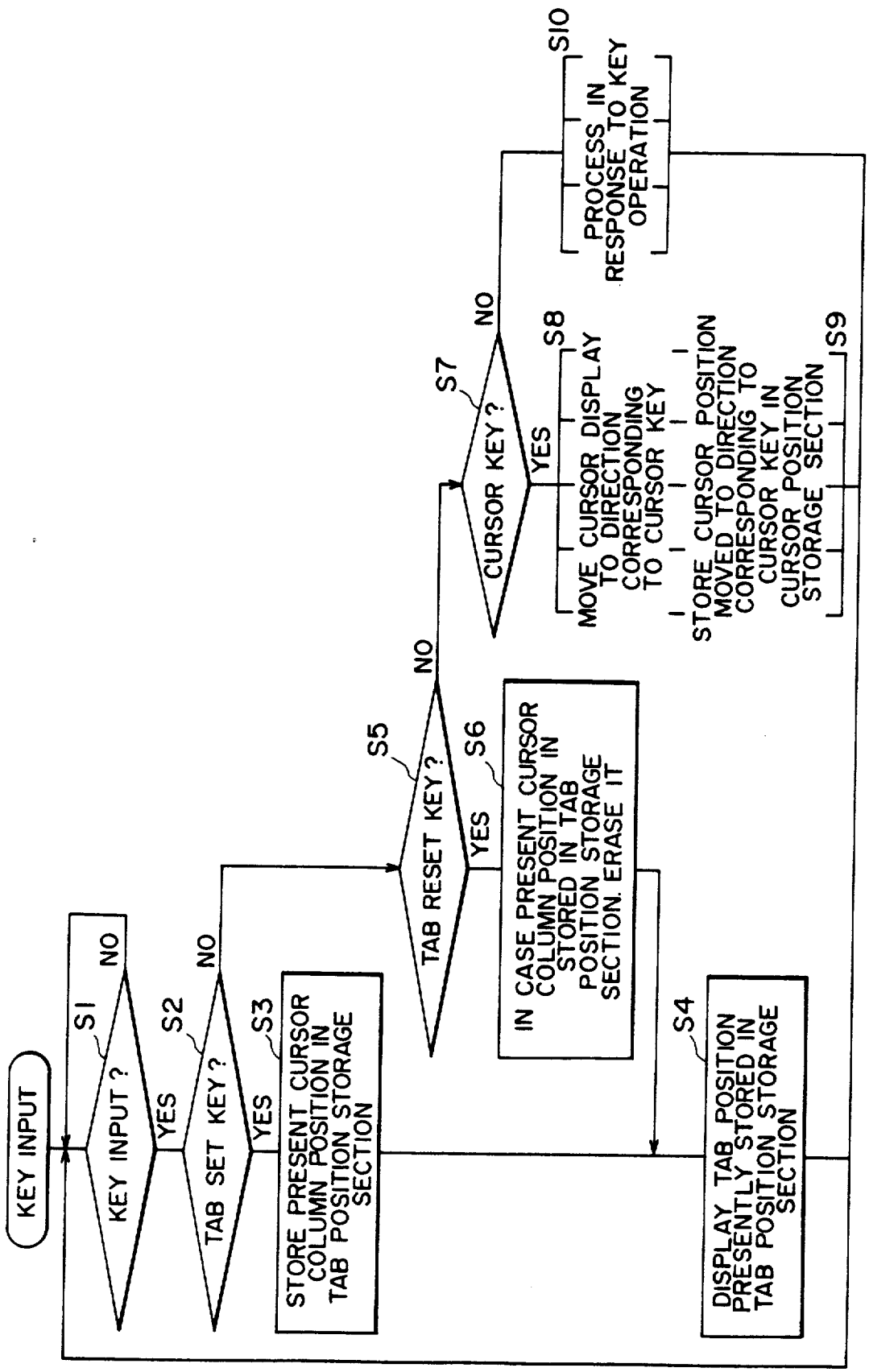
FIG. 3 is a flow chart for explaining the mode of operation of the embodiment of the present invention.

A printer 4 prints a document input by the operator. A memory unit 5 stores a created document a printing pattern, a control program (a program of a control sequence as shown in FIG. 3), and so on. A tab position storage section 6 stores the set tab column position A cursor position storage section 7 stores the present cursor position The units 3 to 5 are connected to the control unit 1 to be controlled thereby.

Figure 2:
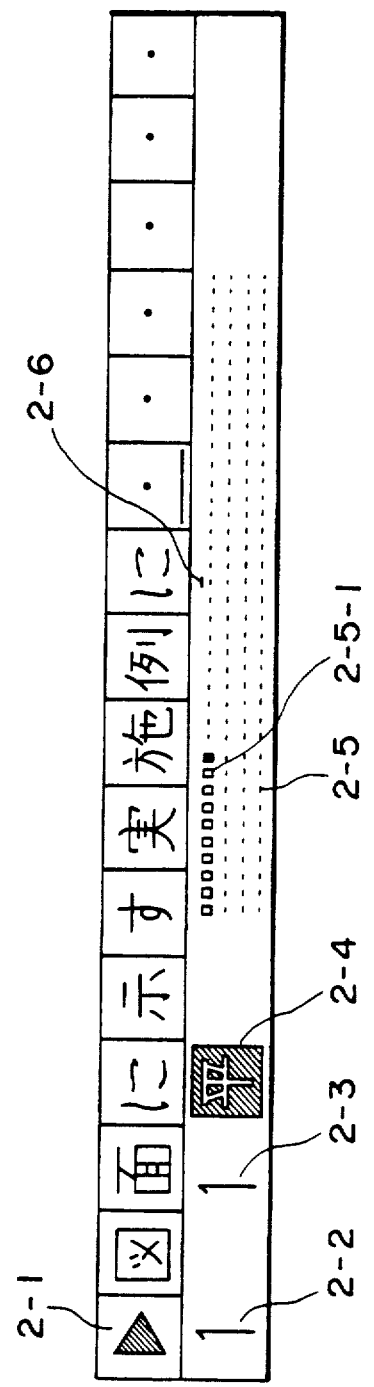
FIG. 2 is a representation illustrating an example of a tab position display according to the embodiment of the present invention.

FIG. 2 shows an example of a tab position display according to this embodiment. FIG. 3 is a flow chart of the control sequence of the key input in this embodiment.

FIG. 2 illustrates an example wherein the display unit has two sections 2-1 and 2-5. The upper display section 2-1 displays a document being created, and the lower display section 2-5 as a layout display section displays the present cursor position, the layout display and the like. The present cursor position is indicated by a present page number 2-2 and a present line number 2-3 of the cursor. The lower display section 2-5 further displays a key shift mode 2 4, a character or symbol pattern 2-5-1 of the document being created in a reduced scale, and a layout tab position 2-6. In the illustrated example, the tab is set at the 20th column.

The mode of operation of the embodiment of the configuration as described above will be described.

Referring to FIG. 3, in step S1, whether a key of the key input unit 2 has been depressed is checked. If YES in step S1, the flow advances to step S2. In step S2, whether the depressed key is checked is the tab set key is checked. If YES in step S2, the flow advances to step S3.

In step S3, the present cursor column position stored in the cursor position storage section is stored in the tab position storage section In step S4, the tab position presently stored in the tab position storage section is supplied to the memory of the display unit and is displayed as indicated at 2-6 in FIG. 2.

In step S5, whether the input key is the tab reset key is checked. If YES in step S5, the flow advances to step S6. If the value stored in the tab position storage section is the same as the present cursor column position stored in the cursor position storage section, it is erased and is extinguished from the display.

In step S7, it is checked if the input key is the cursor key. If YES in step S7, the flow advances to step S8 and the cursor display on the display unit is shifted in the direction corresponding to each cursor key.

In step S9, the cursor position which has been shifted in the direction corresponding to each cursor key is stored in the cursor position storage section.

In step S10, processing corresponding to each input key is performed. When a character key, for example, on the key input unit 2 is operated, corresponding data is stored in the document storage section of the memory unit 5, a corresponding character pattern is displayed on the cursor display position on the upper display section 2-1, the reduced pattern 2-5-1 of the character pattern is displayed on the lower display section 2-5, the cursor position is shifted by one, and the cursor position storage section 7 is updated.

As described above, since the position data such as the set tab position can be displayed on the layout display section the character layout, the tab position and the like of a created document can be confirmed, and column position alignment of input characters can be easily performed.

What is claimed is:

1. Electronic equipment comprising:
   input means for inputting characters at a position designated by a cursor;
   position information input means for inputting position information about the column position alignment of input characters at a position designated by a cursor;
   memory means having a first memory section for storing the characters inputted through said input means, and a second memory section for storing the position information inputted through said position information input means; and
   display means having a first display section for displaying a portion of the characters stored in said first memory section and a second display section for displaying a graphic representation of characters and displaying the position information input through said position information input means, wherein said portion displayed by said first display section and said graphic representation displayed by said second display section are updated and displayed in response to each input of a character by said input means so that the updated portion and graphic representation respectively include the character input at said each input.

2. Electronic equipment according to claim 1, wherein said second display section displays each of the characters with a single dot in a dot matrix-type display.

3. Electronic equipment according to claim 1, wherein said display means has a liquid crystal display.

4. Electronic equipment according to claim 1, further comprising cursor storage means for storing a cursor position, said memory means storing the cursor position stored in said cursor storage means.

5. Electronic equipment according to claim 1, wherein said first display section includes a 1-line display.

6. Electronic equipment comprising:
   input means for inputting characters and designating a tab position at a position designated by a cursor;
   memory means for storing the characters input through said input means;
   tab storage means for storing the tab position input through said input means; and
   dot matrix display means for displaying with a dot a graphic representation of characters including the characters stored in said memory means and for displaying symbols indicating the tab position at the position stored in said tab storage means in the graphic representation, wherein said graphic representation displayed by said dot matrix display means is updated and displaced in response to each input of a character by said input means so that the updated graphic representation includes a character input at said each input.

7. Electronic equipment for creating a document, comprising:
   input means for inputting characters and inputting a tab position at a position designated by a cursor;
   memory means having a first memory section for storing the characters input through said input means, and a second memory section for storing the tab position input through said input means; and
   display means having a first display section for displaying a portion of the characters stored in said first memory section, and a second section for displaying a graphic representation of characters and for displaying symbols indicating the tab position at the position stored in said second memory section by the cursor int he graphic representation, wherein said portion displayed by said first display means and said graphic representation displayed by said second display means are updated and displayed in response to each input of a character by said input means so that the updated portion and graphic representation respectively include the character input at said each input.

8. Electronic equipment according to claim 7, wherein said display means comprises a liquid crystal display.

9. Electronic equipment according to claim 7, wherein said display means includes a 1-line display.

* * * * *

UNITED STATES PATENT AND TRADEMARK OFFICE
CERTIFICATE OF CORRECTION

PATENT NO. : 4,999,788

DATED : March 12, 1991

INVENTOR(S) : Shinichi Kimura

It is certified that error appears in the above-identified patent and that said Letters Patent is hereby corrected as shown below:

COLUMN 2:

```
Line 15, "unit 2" should read --unit 2.--;
Line 19, "operator" should read --operator.--;
Line 22, "document" should read --document,--;
Line 25, "position" should read --position.--;
Line 27, "position" should read --position.--;
Line 41, "24" should read --2-4--; and
Line 51, "is checked" should be deleted.
```

COLUMN 4:

```
Line 41, "int he" should read --in the--.
```

Signed and Sealed this

Twenty-second Day of December, 1992

Attest:

DOUGLAS B. COMER

*Attesting Officer*   *Acting Commissioner of Patents and Trademarks*